United States Patent [19]

Hethuin et al.

[11] Patent Number: 4,791,599
[45] Date of Patent: Dec. 13, 1988

[54] AUTO-CORRELATION ARRANGEMENT

[75] Inventors: Serge Hethuin, Meudon; Hugues Crepin, Velizy; Jérôme Fauret, Fontenay aux Roses, all of France

[73] Assignee: U.S. Philips Corporation, New York, N.Y.

[21] Appl. No.: 895,967

[22] Filed: Aug. 12, 1986

[30] Foreign Application Priority Data

Aug. 13, 1985 [FR] France ................................ 85 12337

[51] Int. Cl.⁴ ........................ G06F 15/20; G06F 7/38
[52] U.S. Cl. ............................................. 364/728.07
[58] Field of Search ........................ 364/728, 819, 724

[56] References Cited

U.S. PATENT DOCUMENTS 4,545,025 10/1985 Hepner et al. ...................... 364/728
4,554,629 11/1985 Smith, Jr. ............................ 364/728
4,561,065 12/1985 Matsuda .............................. 364/724
4,573,136 2/1986 Rossiter ............................... 364/728
4,700,324 10/1987 Doi et al. ............................. 364/728

FOREIGN PATENT DOCUMENTS 2051435 1/1981 United Kingdom .

Primary Examiner—Gary V. Harkcom
Assistant Examiner—Long Thanh Nguyen
Attorney, Agent, or Firm—Thomas A. Briody; Leroy Eason

[57] ABSTRACT

An auto-correlation apparatus for producing N auto-correlation values R(k), (k=0, ... N−1) of an auto-correlation function of a sequence of digital samples x(n), (n= −∞ ... 0, ... p) of an input signal, each sample being encoded as words of "b" binary bits, each value R(k) being defined by the formula:

$$R(k) = \sum_{n=p-M+1}^{n=p} x(n) \cdot x(n - k)$$

wherein M is the number of digital samples. The apparatus comprises a random access memory for storing at respective addresses therein words (X,R) each of which is a concatenation of a word representing the value of a signal sample (X) and a word representing an auto-correlation value (R). A multiplier cooperating with an adder performs multiplying and summing operations on the M most recent signal sample words in accordance with the formula for R(k). A memory addressing and sequencing member supplies an addressing cycle to the memory for each received signal sample words, and controls the operations of the multiplier and adder.

8 Claims, 7 Drawing Sheets

AUTO-CORRELATION ARRANGEMENT

BACKGROUND OF THE INVENTION

1. Field of the Invention

The present invention relates to an auto-correlation arrangement for producing N auto-correlation values R(k) (k=0, ... N−1) of an auto-correlation function of a sequence of digital samples x(n) (n=−∞, ..., 0, ... p) of an input signal, such samples being encoded as words of "b" binary elements, each value R(k) being defined by the formula:

$$R(k) = \sum_{n=p-M+1}^{n=p} x(n) \cdot x(n-k)$$

the arrangement comprising a first register for storing the M most recent samples of the input signal, a second register for storing N values of the auto-correlation function, and at least one multiplying member cooperating with an adder member for effecting multiplying and summing operations of the M samples of x(n) as indicated by said formula.

2. Description of the Related Art

Such an arrangement is used with great advantage in signal processing, more specifically in spectral analysing techniques.

U.K. patent application No. 2,051,435 A discloses such an auto-correlation arrangement; in this known arrangement the first register is a shift register and the second register is constituted by a counter assembly.

This prior art arrangement is not very well suited for realization in integrated circuit technique. Actually, the presence of shift registers requires a significant surface area of the silicon wafer on which the integration must be realized. Generally, it is estimated that for processing a binary element with the aid of a shift register a dozen C.MOS transistors is required.

SUMMARY OF THE INVENTION

The present invention has for its object to provide an auto-correlation arrangement of the type defined in the opening paragraph, with the structure well suited for integration.

To that end, the auto-correlation arrangement set forth in the opening paragraph is characterized in that the first and second registers are constituted by at least one memory of the random access type organized in words each of which is the concatenation of a word representing an auto-correlation value and a word representing the value of a sample and in that it comprises a memory addressing and sequencing member for generating an addressing cycle for each received sample and for controlling the operations of said formula.

Thus, using a random access memory, only four transistors are required for processing a binary element.

In accordance with an important characteristic of the invention, an auto-correlation arrangement is characterized in that it is constituted by an assembly of at least one auto-correlator block comprising a memory of the above-defined type, a multiplying member, an adder member, a first register for storing and delaying the samples at the output of the memory and for applying them to the multiplying member, by a dual-input change-over switch, and a second register for storing the samples produced at the output of the memory addressed by the last code of the addressing cycle of the addressing member and for applying them to a carry output of the auto-correlator. The input of the switch which is not connected to the output of the first register is connected to a carry input of the auto-correlator.

In accordance with these characteristics, the auto-correlation arrangement may be formed by a plurality of auto-correlator blocks of the same structure, which is particularly advantageous to realize them in integrated form. Moreover, it is possible to choose the number of blocks as a function of the desired number of auto-correlation values.

BRIEF DESCRIPTION OF THE DRAWINGS

The following description will make it better understood how the invention can be put into effect and is given by way of non-limitative example with reference to the accompanying drawings. Therein

DESCRIPTION OF THE PREFERRED EMBODIMENTS

Figure 1:
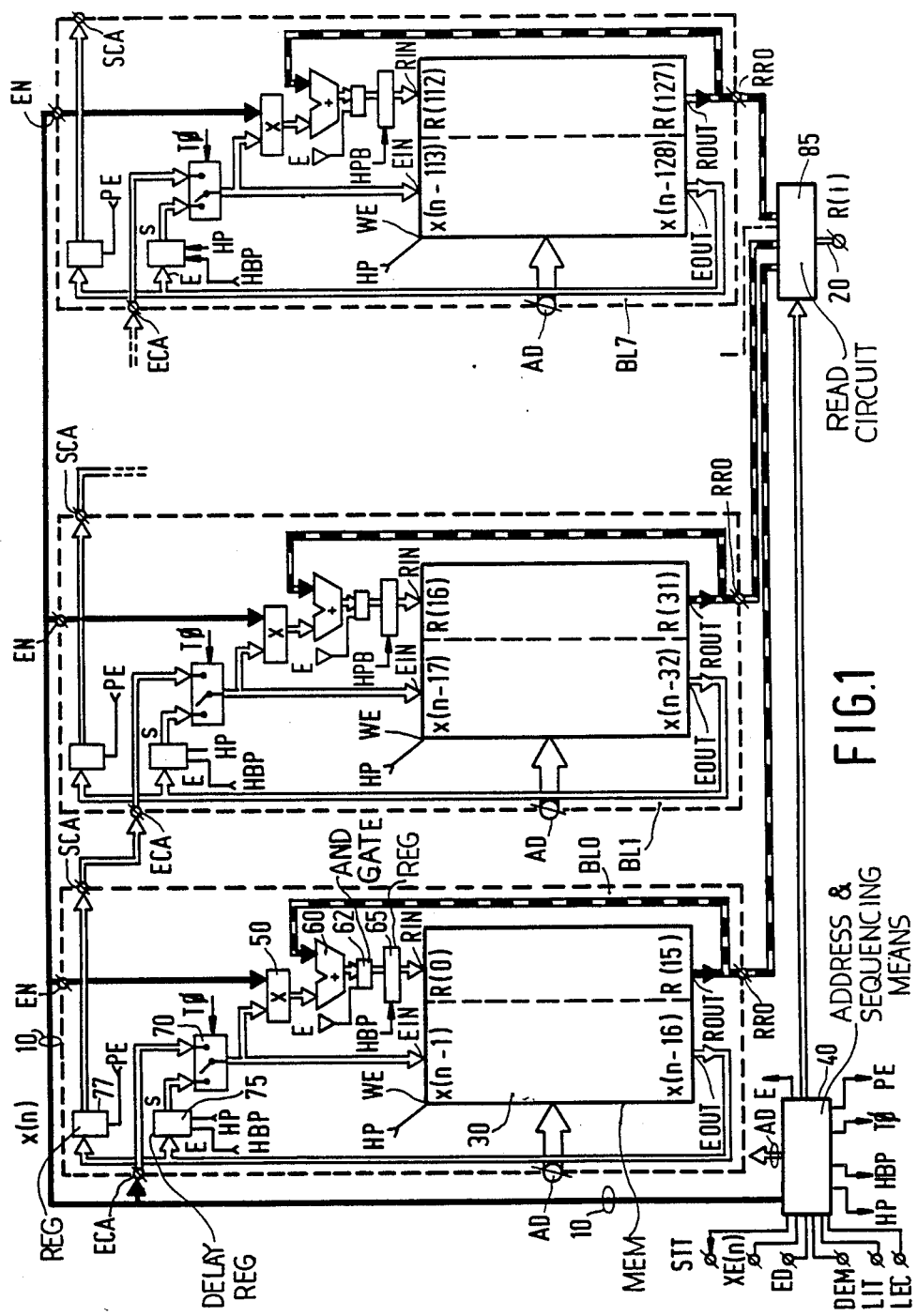
FIG. 1 shows an auto-correlation arrangement according to the invention.

The auto-correlation arrangement in FIG. 1 is arranged for producing 128 auto-correlation values $$R(k) = \sum_{n=p-M+1}^{n=p} x(n) \cdot x(n-k) \quad (1)$$

wherein k=0, 1, ... 127 and x(n) represents the value of the most recently received of the M samples on the basis of which the calculation of the formula is performed.

The digital samples are transmitted from terminal XE(n) via a bus line 10. The auto-correlation values derived therefrom are transmitted to the user at output terminal 20. To enable the operations defined by formula (1) to be effected, it must be possible on the one hand to store M samples preceding the sample x(n) so as to ensure that the summing operation between p and p−M+1 can be effected, and on the other hand also to store the N values of R(k) so that they appear at terminal 20 for each new sample received. In accordance with the invention, the first auto-correlator block BLO includes at least one random access memory 30 which is organized in 16 words, each of which is the concatenation of a word representing an auto-correlation value R(k) and a word representing the value of the sample x(n−k−1) and, additionally, an addressing and sequencing member 40 is provided for generating an addressing cycle of 16 word address codes AD for each received sample and for controlling the operations defined in formula (1) using the signals E, HP, HBP, TØ and PE.

For each of said words, the input of the memory 30 is divided into two groups of inputs EIN and RIN and the output into two groups of outputs EOUT and ROUT assigned to the samples and to the auto-correlation values, respectively. In this described example, an addressing cycle consists of producing sixteen address codes AD, which corresponds to the capacity of the memory 30 and for each code a read time is provided for receiving the words at the outputs EOUT and ROUT and a write time for storing the words present at the inputs EIN and RIN. These periods of time are defined by the signals HP applied to the write control input WE of the memory 30. This will be described in greater detail hereinafter. The multiplying and summing operations defined by the formula (1) are effected by processing means comprising a multiplying member 50 and an adder member 60. The output of the adder member 60 is connected to an AND-gate 62 and is supplied thereby to a buffer register 65 if a signal E of an appropriate value is applied to the AND-gate 62. So as to ensure that the output of gate 62 is stored, it is necessary to apply a signal HBP to the storage control of the buffer register 65. The output of this register 65 is connected to an input RIN of the memory 30.

The adder member 60 has two inputs, one of which is connected to the output ROUT of memory 30 and the other to the output of the multiplying member 50. The multiplying member 50 has two inputs; one of these inputs is connected to a terminal EN connected to bus line 10 and the other to the output of a change-over switch 70 which has two positions which are controlled by switching signals T$\emptyset$. This change-over switch has two access inputs one of which is connected to a terminal ECA connected to bus line 10 and the other to the output of a register circuit 75 constituted by two cascaded registers whose recording controls receive the signals HBP and HP so that this register produces a time delay equal to the period of time separating the active values of these signals HBP and HP. The output of change-over switch 70 is not only connected to the input of the multiplying member 50 but also to the input EIN of the memory 30. The output ROUT of the memory 30 is not only connected to an input of the adder member 60, but also to a terminal RRO. A register 77 has been provided whose output is connected to a sample carry output terminal SCA of auto-correlator BLO, the input to register 77 being connected to the output EOUT of the memory 30. The storage control terminal of this register 77 receives the signal PE.

The arrangement described in the foregoing constitutes an auto-correlation block BLO producing the sixteen auto-correlation values R(0) to R(15) at terminal RRO. To produce the other values, seven further auto-correlation blocks BL1 to BL7 are provided whose structure is in every detail identical to the structure of the block BLO. (The reference numerals of BL1 to BL7 in FIG. 1 are omitted). The block BL1 produces the sixteen auto-correlation values R(16) to R(31), the block BL2 produces the sixteen values R(32) to R(47), and so forth until block BL7 which produces the values R(112) to R(127). These blocks are all interconnected in the following manner. All the terminals EN are connected to the x(n) bus line 10; the input terminal ECA of the block BLO is connected to line 10, whilst the input terminal ECA of each of the other blocks are connected to the sample carry output terminal SCA of the preceding block. Thus, input terminal ECA of the block BL1 is connected to sample carry output terminal SCA of the block BLO, . . . , input terminal ECA of the block BL7 is connected to sample carry output terminal SCA of the block BL6 (not shown). It should be noted that the sample carry output terminal SCA of the last block BL7 is not connected. The terminals ECA and SCA constitute inputs and outputs for signal samples leaving one block and going to the subsequent block. A read circuit 85 controlled by the addressing and sequencing member 40 renders it possible to supply the different values R(k) produced by all blocks at the terminal 20.

The following description explains in broad terms the mode of operation of the auto-correlation arrangement of FIG. 1.

First of all, the conditions mentioned in FIG. 1 will be described. That is to say that:

it is assumed that at the instant "n" the sample of the signal x(n) is available on the line 10, arranged in the memory 30 of the block BLO at the address "0" there is present already the word formed from the sample x(n−1) and the auto-correlation value R(0), at the address "1" the word for sample x(n−2) and R(1), and so forth up to the address "15" at which the word for sample x(n−16) and the value R(15) are stored, x(n−17) to x(n−32) and R(16) to R(31) are stored in memory 30 of the block BL1 at the addresses "0" to "15" (or "F" in hexadecimal notation), respectively, this continues until block BL7, where x(n−113) to x(n−128) and R(112) to R(127) are stored at the addresses "0" to "15" (or "F" in hexadecimal notation) respectively.

Figure 2:
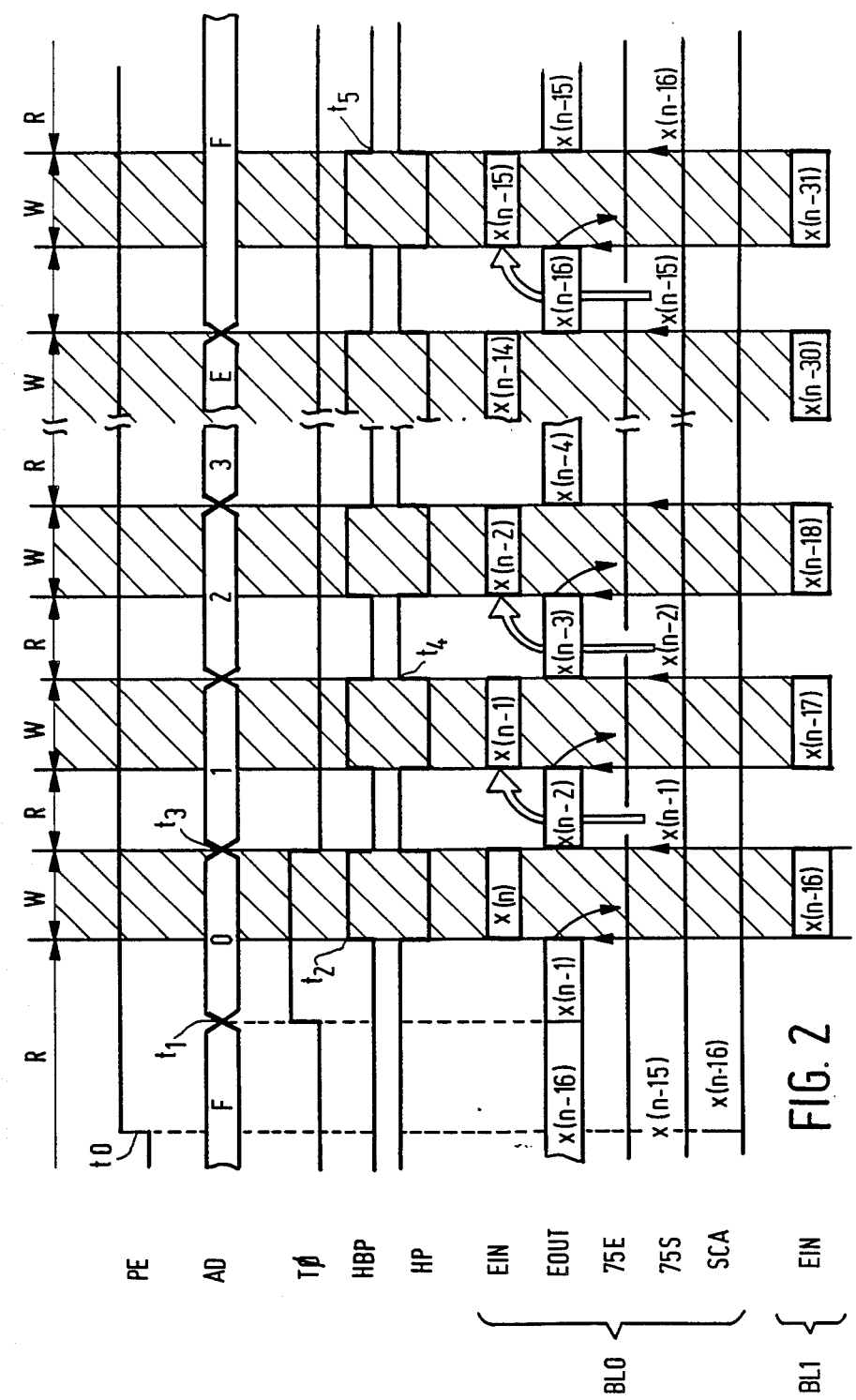
FIGS. 2 and 3 are time diagrams to explain the mode of operation of the arrangement of FIG. 1.

Now, with reference to FIG. 2, the route of a sample x(n−i) inside the memories 30 of the different blocks BL0 to BL7 will be described.

When a new sample (for example the sample x(n)) appears at the terminal 10, whose presence is signalized by a signal ED, at the instant t0 (FIG. 2), the signal PE supplied by the addressing and sequencing number 40 assumes the value "1". At this instant all the memories are in the READ position (denoted by R in FIG. 2), the signal HP having the value "1". The addressing code applied to the inputs AD of all the blocks BL0 to BL7 is "F" so that at the output EOUT of the memory 30 of block BLO there is a sample x(n−16) which is supplied to the register 77 and stored therein. It is then easy to realise that the registers 77 of the following blocks BL1, BL2, . . . BL6 will contain x(n−32), x(n−48), . . . x(n−112). Thereafter, at the instant t1, the member 40 generates the address code "0" and sets the signal T$\emptyset$ to the active state so that the output of the changeover switch 70 is connected to the input EIN of memory 30 in all the blocks BLO to BL7. The memories are in the READ "R" position, so that at their outputs there are, for the respective blocks BL0 and BL1, the samples x(n−1) and x(n−17). Then the instant t2 occurs at which the signal HP assumes the value "0" and the signal HBP assumes the value "1" (HBP=$\overline{\text{HP}}$), that is to say the memories 30 are set to the WRITE mode, which is indicated in FIG. 2 by a hatched zone W.

Then the memories of the blocks BL0, BL1, . . . BL7 store at the address "0" the samples x(n), x(n−16), . . . , x(n−112), respectively, these samples being received from respectively the line 10 and the outputs of the registers 77 of the blocks BL0 and BL6. The ascending edge of the signal HBP causes samples available at the output EOUT to be stored in the delay number 75. The number 75 of the block BLO starts to store the sample x(n−1), the member 75 of the block BL1 starts to store the sample x(n−17), etc. and the member 75 of the block BL7 starts to store the sample x(n−113).

Then the instant t3 occurs at which the addressing code becomes "1" and at which the memories are set to the READ position. At that instant t3, the signal TØ assumes the value of "0", which implies that the outputs of the change-over switches 70 of all the blocks BL0 to BL7 are connected to the output S of the delay register 75. The ascending edge of the signal HP, which also occurs at this instant t3 causes the sample stored at the instant t2 to be outputted. Thus, the respective add samples $x(n-1), x(n-17), \ldots x(n-113)$ are available at the outputs S of the registers 75 of the blocks BL0, BL1, ..., BL7 whilst the preceding even samples $x(n-2), x(n-18), \ldots, x(n-114)$ are present at the output EOUT of the memories 30 of these blocks. Then, at the instant t4 occurring at the instant at which the signal HP assumes the value "0", the samples $x(n-2), x(n-18), \ldots, x(n-114)$ are stored in the registers 75 and the corresponding following samples $x(n-1), x(n-17), \ldots, x(n-113)$ are entered into the memories at the address "1". Thus by means of the delay registers 75, all the samples are shifted one line downwards at the end of an addressing cycle occurring at instant t5.

After instant t5 the arrangement is adjusted to the phase in which it waits for a new sample. In this stand-by phase, the address remains fixed at "F", the signal HP retains the value "1", that is to say the memories 30 are adjusted to the READ position.

Figure 3:
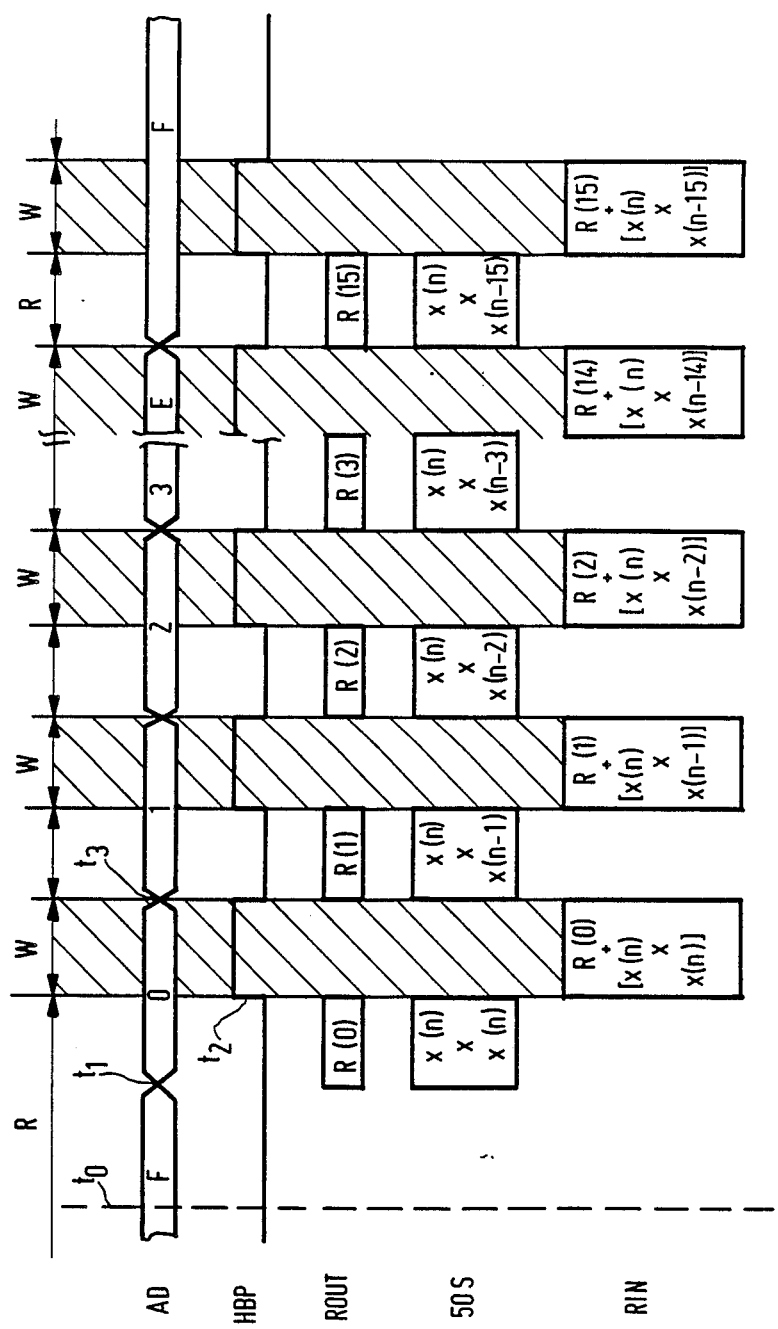

The formation of the different auto-correlation values will be described hereinafter with reference to FIG. 3. In this Figure the instants t0, t1, t2, t3 correspond to the instants shown in FIG. 2. After the instant t0 at which the sample $x(n)$ is available on the line 10, the instant t1 occurs at the address code is "0"; then at the output ROUT of the memory 30 of the block BL0 the value $R(0)$ is present which is applied to one of the inputs of the adder member 60, whilst the result of the multiplying operation effected by the member 50 is present at the other input, that is to say the product of the samples available at the inputs EN and ECA: for block BL0 the product is $x(n).x(n)$, for block BL1: $x(n).x(n-16), \ldots,$ for block BL7: $x(n).x(n-112)$. This is shown only for block BL0 at line 50S for FIG. 3. At the instant t3 the address code assumes the value "1", which causes the multiplying member 50 to calculate the product of the sample available at terminal EN (or on the line 10) and the sample at the output of the delay member 75. Consequently, for block BL0 this product is $x(n).x(n-1)$, for block BL1, $x(n).x(n-17), \ldots,$ for block BL7, $x(n).x(n-114)$. This product will accumulate with the values $R(1), R(17), \ldots R(114)$ and this continues until the address code reaches "F". The manner in which the different values $R(i)$ are obtained will be described in the description of the mode of operation of the read member 85.

Figure 4:
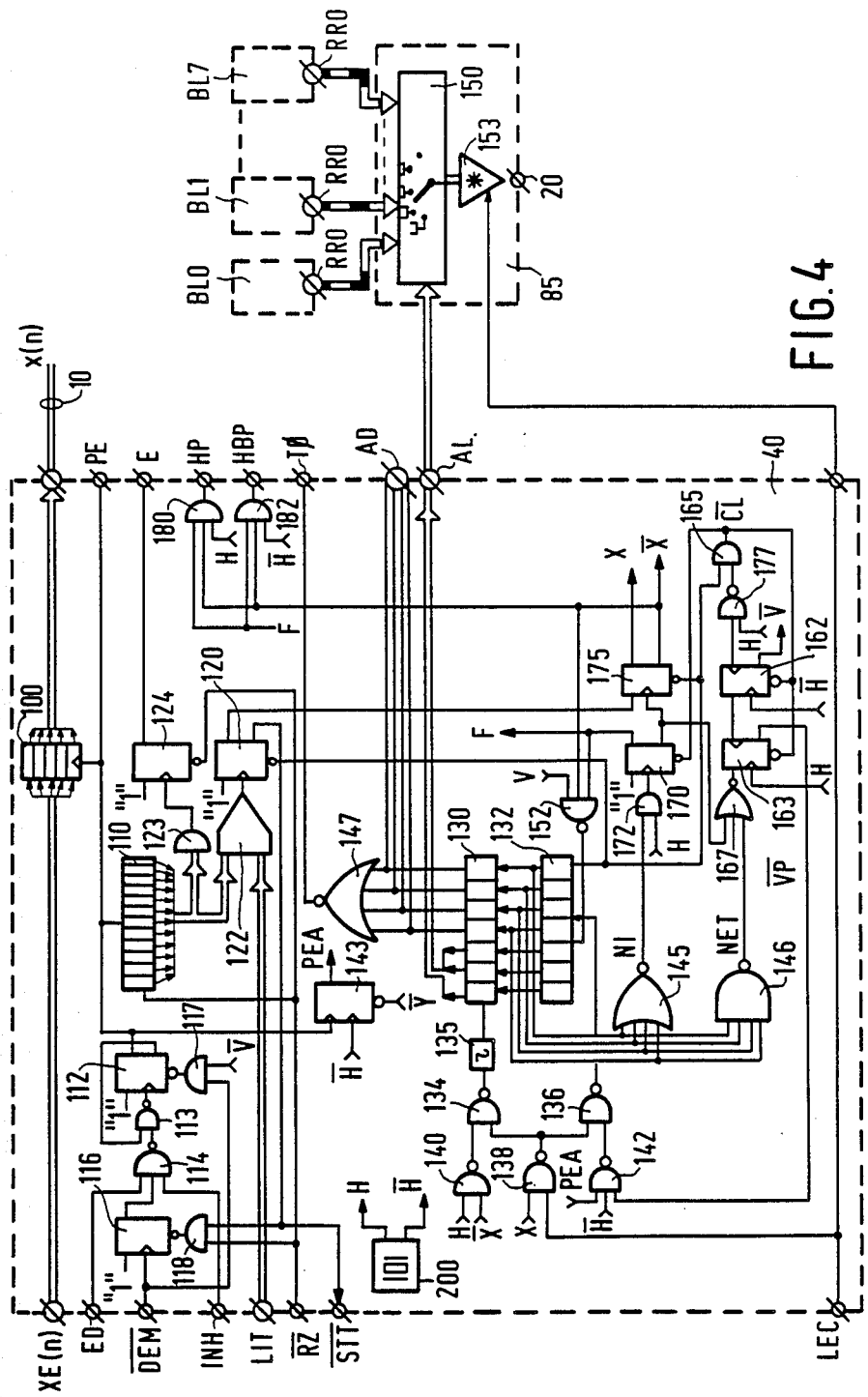
FIG. 4 shows a detail of the embodiment of an addressing and sequencing member on the one hand, and a read circuit on the other hand, the whole assembly being suitable for use in the auto-correlation arrangement of FIG. 1.

The addressing and sequencing member 40 shown in FIG. 1 will now be described in greater detail with reference to FIG. 4. This member has several input ports intended to be connected to external circuits; a first port is provided for receiving the input sample $XE(n)$; before being transmitted via the line 10, this sample $XE(n)$ is conveyed to a register 100. The sample is then given at the output of this register 100 the reference $x(n)$. The sample $XE(n)$ is validated by a signal ED. The member 40 cannot become operative until the signal $\overline{DEM}$ is adjusted to the active state, always after a reset-to-zero by means of a signal $\overline{RZ}$. The member 40 stops performing the correlation operation when the number of samples processed has become equal to a predetermined number LIT, the typical values ranging from some hundreds to some thousands. To make the read circuit operative, a signal LEC is made active. It is however necessary, before rendering this signal LEC active, to check a signal $\overline{SST}$ which indicates that the calculation of the auto-correlation values has ended.

The member 40 comprises first of all a sample counter 110 which has a reset-to-zero input receiving the signal $\overline{RZ}$ and whose value is incremented in response to each active edge of the signal PE. This same edge controls storing the values in the register 100. The signal PE is produced by a D-type bistable trigger circuit 112. The output $\overline{Q}$ of this bistable trigger circuit is connected to an input of a NAND-gate 113 having two inputs. The other input of this gate 113 is connected to the output of a NAND-gate 114 having three inputs. The first input of this gate 114 receives the signal ED, the second input a signal INH for preventing unwanted samples from being taken account of and the third input is connected to the output of Q of a D-type bistable trigger circuit 116. The input D of this bistable trigger circuit 116 permanently receives a logic signal having value "1" and the triggering input receives the signal $\overline{DEM}$ which is also applied to the reset-to-zero input of the bistable trigger circuit 112 via an AND-gate 117. This dual-input gate receives, in addition to the signal $\overline{DEM}$, a signal $\overline{V}$. Resetting the bistable trigger circuit 116 to zero is effected by the output signal of an AND-gate 118 having two inputs. One of these inputs receives the signal $\overline{RZ}$ and the other input the signal $\overline{STT}$ coming from the output Q of a D-type bistable trigger circuit 120. The input D of this bistable trigger circuit 120 permanently receives a logic "1" signal, and its reset-to-zero input receives the signal $\overline{RZ}$. The triggering input is connected to the output of a code comparator 122. This comparator effects the comparison between the code contained in the sample counter 110 and the code LIT. A decoder 123 decodes an intermediate position of the counter 110. A bistable trigger circuit 124 registers the passage of this intermediate position and thus produces the signal E. The D input of this bistable trigger circuit continuously receives a logic signal "1", and its reset-to-zero input receives the signal $\overline{RZ}$. The codes AD are provided by a register 130 which has for its object to register the contents QQ of a seven-position counter 132, in response to a signal produced by a NAND-gate 134, via a member 135 which causes a slight delay of the order of the time necessary for a signal to pass through a gate. This counter 132 has a reset-to-zero input at which the signal $\overline{RZ}$ is received. A NAND-gate 136 produces the signal to increment this count 132. The output signal of a NAND-gate 138 is applied to one of the two inputs of the gates 132 and 136. The other input of the gate 134 is connected to the output of NAND-gate 140 and the other input of the gate 136 is connected to the output of NAND-gate 143. The NAND-gate 140 receives at its inputs the signals H and $\overline{X}$, the NAND-gate 138 receives the signals X and LEC, the NAND-gate 142 receives the signals PEA, $\overline{H}$ and $\overline{VP}$. The signal PEA originates from a D-type bistable trigger circuit 143 whose D-input receives the signal PE, whose triggering input receives the signal $\overline{H}$ and whose reset-to-zero input receives the signal $\overline{V}$. Different decoders 145, 146 and 147 are connected to the counter 132 and to the register 130. The decoder 145 is constituted by a NOR-gate whose four inputs are connected to four least significant positions of the counter 132 and produces a signal NI. The decoder 146 is constituted by a NAND-gate whose four inputs are also connected to four least significant positions of the counter 132 and produces a signal NET. The decoder 147 is constituted by a NOR-gate whose four inputs are connected to outputs of the register 130 corresponding to the four least significant positions of the counter 132 and produces the signal $T\overline{\phi}$. The code AD is also taken from these outputs of the register 130. It should be noted that from now on the positions of the counter 132 which contain the most significant binary elements are used, via register 130, for controlling the output multiplexer 150 which forms part of the read circuit 85. The counter 132 is divided in two parts; each of these parts may be reinitialised in an independent manner, that is to say that all the positions of these parts of the counter are set to "1". The part relating to the four most significant positions can be set to "1" by the signal $\overline{RZ}$; the part relating to the three most significant positions can be set to "1" by the output signal of a NAND-gate 152 which has three inputs for receiving the respective signals, V, F and $\overline{X}$. The signal V is the signal at the output Q of a D-type bistable trigger circuit 162; the D-input of this bistable trigger circuit receives the signal VP appearing at the output Q of a further D-type bistable trigger circuit 163. The triggering input of the bistable trigger circuit 162 receives the signal $\overline{H}$ and its reset-to-zero input receives the signal $\overline{CL}$ supplies by an AND-gate 165. The D-input of the bistable trigger circuit 163 is connected to the output of a NOR-gate 167 and the triggering input receives the signal H, its reset-to-zero input receives the signal $\overline{CL}$. One of these two inputs of the gate 167 receives a signal NET which is produced by the decoding gate 146, the other input receives the signal $\overline{F}$ which appears at the output of a D-type bistable trigger circuit 170. Its input D continuously receives a logic "1" signal, its triggering circuit is connected to the output of an AND-gate 172 and its reset-to-zero input receives the signal $\overline{CL}$. The signal F appears at its output Q. The AND-gate 172 receives at its two inputs the signal H and the signal NI processed by the decoding gate 145. The signal $\overline{F}$ is applied to the triggering input of a D-type bistable trigger circuit 175. The D-input of this bistable trigger circuit 175 is connected to the output Q of the bistable trigger circuit 120 to receive the signal STT, the reset-to-zero input receives the signal $\overline{RZ}$. The signals X and $\overline{X}$ appear at the outputs Q and $\overline{Q}$ of this bistable trigger circuit 175. The gate 165 which supplies the signal $\overline{CL}$ has two inputs, one of which receives the signal $\overline{RZ}$ and the other one is connected to the output of a NAND-gate 177. One of the two inputs of this gate 177 receives the signal V from the output Q of the bistable trigger circuit 162 and the other input receives the signal H. Two AND-gates 180 and 182, which have three inputs, produce the signals HP and HBP, respectively. The signals F and $\overline{X}$ are applied to two inputs of these gates 180 and 182. The signal H is applied to the third input of the gate 18' and the signal $\overline{H}$ to the third input of the gate 182. A clock circuit 200 produce the complementary signals H and $\overline{H}$.

The multiplexer 150 which forms part of the read circuit 85 has eight inputs each of which is connected to the output RRO of the blocks BL0 to BL7, respectively. Connecting one of these inputs to the output of the multiplexer 150 is determined by the code AL, which is contained in the three positions of the register 130 for the most significant binary elements originating from the counter 132. A series of three-state amplifiers 153 are provided at the output of this multiplexer 150. The output code of the multiplexer cannot be conveyed to the terminal 20 until the signal LEC is active, thus adjusting the amplifiers of the series 153 to the conducting state.

Now a description will be given of how the addressing and sequencing member 40 operates.

This operation comprises three stages: an initialising stage, a calculation stage and a read stage.

(a) Initializing stage.

From the instant at which $\overline{RZ}$ and $\overline{DEM}$ have been activated, the samples XE(n) can appear, accompanied by their energizing signals ED. These signals ED are transferred to the triggering input of the bistable trigger circuit 112. The gate 114 being open, the signal at the output of the bistable trigger circuit 116 has the value "1" and it is assumed that the signal INH has also the value "1". The gate 113 is also open as the bistable trigger circuit 112 has been reset to zero; the signal at its output $\overline{Q}$ has the value "1". As will become apparent hereinafter, the bistable trigger circuit 112 is reset to zero before the occurrence of a new sample so that it can be assumed that an active value of the signal PE corresponds to each appearance of a sample. During this whole initializing stage the signal E remains inactive, that is to say a signal having value "0" is applied to the input RIN of the memories 30, whilst the samples received are progressively stored in all the memories 30, as will be described in detail in the following stage which starts from the moment a given number of samples exceed a number detected by the decoder 123. The signal E at the output of the bistable trigger circuit 124 changes to the "1" stage.

(b) Calculation stage.

Figure 5:
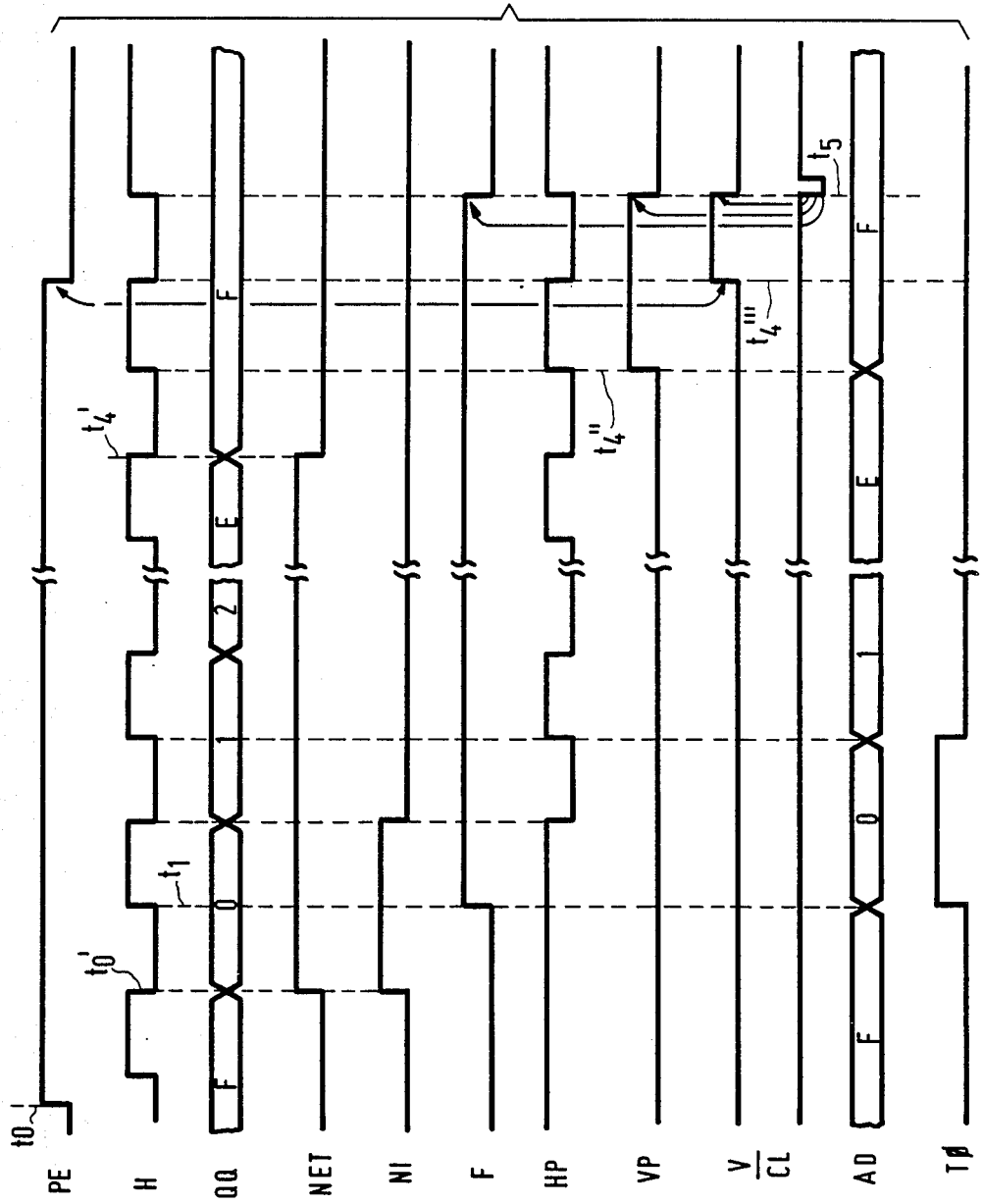
FIGS. 5 and 6 are time diagrams to explain the mode of operation of the member and the circuit shown in FIG. 4.

First of all, with reference to FIG. 5, it will be explained how the addressing cycle and the different signals for the calculation and the updating of the different auto-correlation values are generated. The instants corresponding to those in FIGS. 2 and 3 have been given the same reference numerals. Now the instant t0 in FIG. 5, which corresponds to an ascending edge of the signal PE, will first be considered. Thereafter the instant t0' will be considered at which the signal $\overline{H}$ assumes the value "1"; this causes the bistable trigger circuit 143 to change state, so that the signal PEA assumes the value "1", thus rendering the gate 142 "conductive". Consequently the gate 142 and the gate 136 will allow the signal $\overline{H}$ to pass so that the content QQ of the counter can be incremented by one unit at the instant t0' corresponding to a descending edge of the signal H. It is assumed that the content QQ (at this moment only the four least significant binary elements will be considered) was "F" before the instant t0', so that after t0' the content becomes "0". Thereafter, at the instant t1, thus content will be transferred to the register 130. It is sufficient to note that the signal NET assumes the value "1" for QQ passing from 0 to E, that the signal NI assumes the value "1" for QQ=0 and that the signal $T\phi$ assumes the value "1" for AD=0. Inside the change-over switches 70 (FIG. 1) this value "1" of $T\phi$ causes their outputs to be linked to the outputs of ECA, the instant t1 corresponding to the ascending edge of the signal F, which renders it possible for the signals HP and HBP to become active. Thereafter, each descending edge of the signal H causes the content QQ to be incremented, which content will consequently assume the following successive values: "0", "1", "2", ..., "E" and "F". Take, for example, the instant t4' at which the code QQ assumes the value "F". At that instant as a result thereof, the signal NET changes to the value "0". The value of the signal at the output of the gate 167 is "1"; the ascending edge occurring after the instant t4" causes the signal VP to change to the value "1", which, inter alia, provides closure of the gate 142; the counter 132 stops incrementing. Thereafter, at the instant t4''' defined by an ascending edge of the signal $\overline{H}$ (that is to say a descending edge of H), the bistable trigger circuit 162 changes state and the signal V assumes the value "1". This change to the value "1" triggers the bistable trigger circuits 112 and 143. The signals PE and PEA assume the value "0". Since the signal V has the value "1", the gate 177 is open and when the value H assumes the value "1", at instant t5, the signal $\overline{CL}$ will become active, which causes the signals F, VP and V to be reset to zero, and the signal CL to become inactive again. After this instant t5, a new sample can be processed.

(c) Reading stage.

Figure 6:
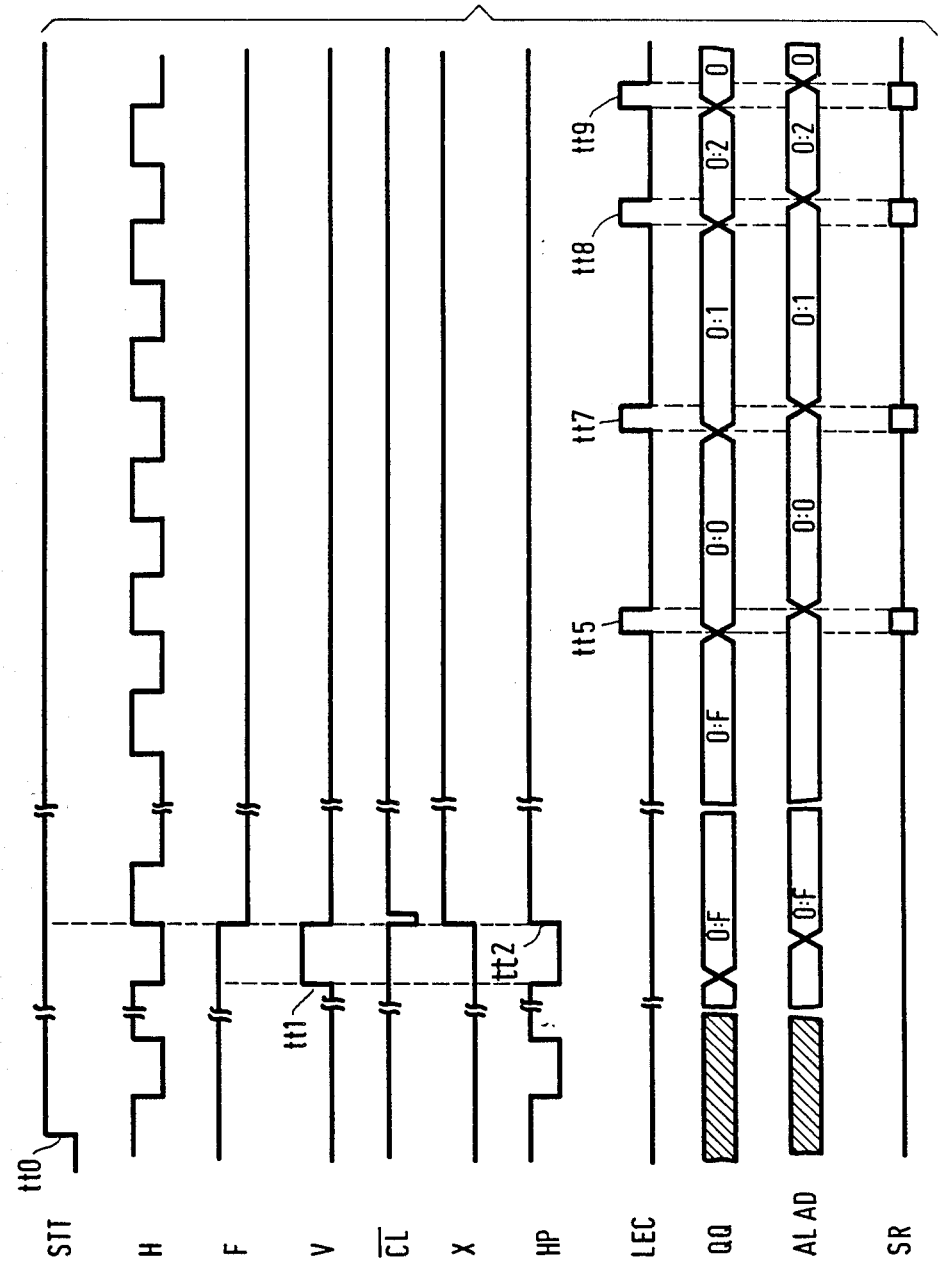

Reference is made to FIG. 6. To enable this reading operation to be effected, it is necessary for the number of processed samples counted by the counter 110 to be the predetermined number established by means of the word LIT. This is detected by the comparator 122 which, then, causes the bistable trigger circuit 120 to change state, the signal STT assumes the value "1": that is to say tt0 at that instant. The complementary signal $\overline{STT}$ is applied to the reset-to-zero input of the bistable trigger circuit 166, this rendering the gate 144 non-conducting. The arrival of new samples will not be taken into account anymore from that moment onwards. The same procedure is performed, for the last sample, as for the others. The only change occurs at the instant tt1 at which the signal V assumes the value "1". Thereafter, at the instant tt2, the signal X assumes the value "1", which is triggered by the descending edge of the signal F and because of the fact that the signal STT is applied to the D input of the bistable trigger circuit 175. The value X=1 enables the development of the three most significant bits of the counter 132; these bits can then be incremented after each addressing cycle. At that instant, the gates 180 and 132 are rendered non-conducting and the signals HP and HBP can no longer develop. Similarly, the gate 140 is rendered non-conducting and the signals H can no longer effect the transfer, in the register 130, of the content of the counter 132, which is "F". The reading operation can then start; it is always advisable for the user to check, before effecting the reading operation, whether the signal $\overline{STT}$ has the desired value. The system then operates in the asynchronous mode and reading is effected at the pulse rate of the signal LEC. At the instant tt5 this first pulse appears. The ascending edge of this pulse causes the counter 132 to increment, which consequently proceeds to zero; thereafter, after the time delay produced by the member 135, the contents of the counter 132 is conveyed to the register 130.

It should be noted that the appearance at the output RRO of the memories 30 (FIG. 1) of the auto-correlation values calculated in, for example, 11 binary elements is effected in response to the second pulse occurring at the instant tt7, when the address code at AD is equal to zero. During a first addressing cycle in which the code AL=0, the coefficient R(0), thereafter R(1) . . . until R(15) are present at the terminal 20; thereafter the code AL will assume the value "1" and, obviously, thereafter R(16), R(17) . . . will be obtained and finally the values R(112) to R(127) are withdrawn from the last block BL7.

Figure 7:
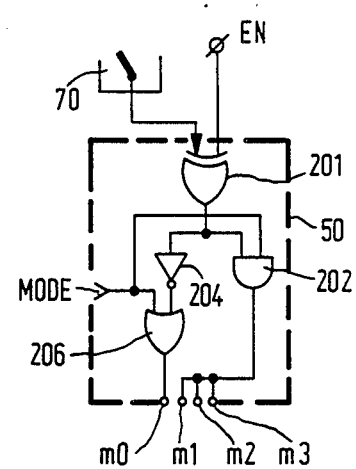
FIG. 7 shows a detail of an embodiment of a multiplying member suitable for use in the auto-correlation arrangement of FIG. 1.

Realizing an auto-correlation in accordance with the invention becomes still more advantageous when the sample is coded with only one single binary element representing its sign (+) or (−). The structure of the multiplying element 50 well suited for this case is shown in detail in FIG. 7.

This member 50 is formed on the basis of an EXCLUSIVE'OR gate 201 whose two inputs are the operand inputs of this member. The output of this gate 201 is connected to one of the two inputs of an AND-gate 202 and also to the input of an inverter 204 whose output is connected to one of the two inputs of an OR-gate 206. The second inputs of the gates 206 and 202 receive a MODE signal whose function will be explained hereinafter. The output of the OR-gate 206 transfers the least significant element, denoted by "m0" for the adder member which acts, for example, on the four-bit words to be added together, the three last binary elements referenced "m1, m2, m3" to be considered at the output of the member 50 being all three taken from the output of the gate 202.

The word formed by four binary elements applied to the adder member will be modified as a function of the value of the MODE signal. The case will be described in which MODE=0.

When the two signals at the inputs of the gate 201 have the same values, that is to say the same signs, the signal at the output of the gate 201 is "0", so that the word m3, m2, m1, m0 is "0001" and, for different signs "0000".

The case in which MODE=1 will now be described.

When the two signals at the inputs have the same signs, m3, m2, m1, m0=0001.

When the two signals at the inputs have different signs, m3, m2, m1, m0=1111, which corresponds to −1.

What is claimed is:

1. An auto-correlation apparatus for producing N auto-correlation values R(k), (k=0, . . . N−1) of an auto-correlation function of a sequence of digital samples x(n), (n=−∞ . . . , 0, . . . p) of a received input signal, such sample being encoded as words of "b" binary bits, each value R(k) being defined by the formula:

$$R(k) = \sum_{n=p-M+1}^{n=p} x(n) \cdot x(n-k)$$

where M is the number of samples from which each value R(k) is to be determined; such apparatus comprising:

a random access memory for storing at respective addresses therein a plurality of words each of which is a concatenation of a respective one of said digital sample words and a digital word representing a respective one of said auto-correlation values, such memory having a first input and a first output for signal sample words and a second input and second output for auto-correlation words;

processing means having first and second inputs respectively coupled to said first and second outputs of said memory, a third input for receiving signal sample words, and an output coupled to said first input of said memory; such processing means comprising a multiplier for multiplying signal sample words received at the first and third inputs thereof and an adder for adding the products so produced to auto-correlation words received from the second output of said memory so as to derive further auto-correlation words, such further auto-correlation words being supplied by said adder to the second input of said memory for storage therein; and memory addressing and sequencing means for supplying said received signal sample words to said first and third inputs of said processing means, such addressing and sequencing means providing read and write cycles of address codes to said memory for storing therein and reading out therefrom signal sample words and auto-correlation words in accordance with said formula;

whereby the auto-correlation values R(k) are stored in said memory and can be read therefrom at the second output thereof, said second output being the output terminal of the auto-correlation apparatus.

2. Auto-correlation apparatus as claimed in claim 1, further comprising:

switching means having a first input for receiving signal sample words from said addressing and sequencing means, a second input coupled by a delay register to said first output of said memory, and an output coupled to said first input of said processing means; said switching means being controlled by said addressing and sequencing means to supply delayed signal sample words to said processing means and to said memory; and a second register for receiving from said first output of said memory a signal sample word addressed by the last code of the addressing cycle of said addressing and sequencing means and supplying such signal sample word to a signal sample carrier output of the auto-correlation apparatus.

3. Auto-correlation apparatus as claimed in either of claims 1 or 2, further comprising a read circuit connected to said output terminal thereof for reading out the auto-correlation values stored in said memory.

4. Auto-correlation apparatus as claimed in claim 3, wherein each of the received signal sample words is a word having a single binary element (b=1) indicating the sign of such sample.

5. An auto-correlation apparatus as claimed in claim 4, wherein said multiplier has an input for receiving a mode code specifying a first and a second operating mode; in said first mode the value "1" being the result of multiplication of two samples of the same sign and the value "0" being the result of multiplication of two samples of different signs; and in said second mode the value "1" being the result of multiplication of two signal samples of the same sign and the value "−1" being the result of multiplication of two signal samples of the opposite sign.

6. Auto-correlation apparatus as claimed in either of claims 1 or 2, wherein each of the received signal sample words is a word having a single binary element (b=1) indicating the sign of such sample.

7. An auto-correlation apparatus as claimed in claim 6, wherein said multiplier has an input for receiving a mode code specifying a first and a second operating mode; in said first mode the value "1" being the result of multiplication of two samples of the same sign and the value "0" being the result of multiplication of two samples of different signs; and in said second mode the value "1" being the result of multiplication of two signal samples of the same sign and the value "−1" being the result of multiplication of two signal samples of the opposite sign.

8. An auto-correlation arrangement comprising a series of units each of which is an auto-correlation apparatus as claimed in claim 2, the signal sample carry output of each such apparatus being connected to the first input of the switching means in the succeeding apparatus, each auto-correlation apparatus producing a set of auto-correlation values at its output terminal, such set succeeding the set of auto-correlation values produced at the output terminal of the preceding auto-correlation apparatus.

* * * * *